Dec. 25, 1962
S. W. GROSSMANN
3,070,425
PRODUCTION OF NITROGEN TETROXIDE
Filed Oct. 15, 1959
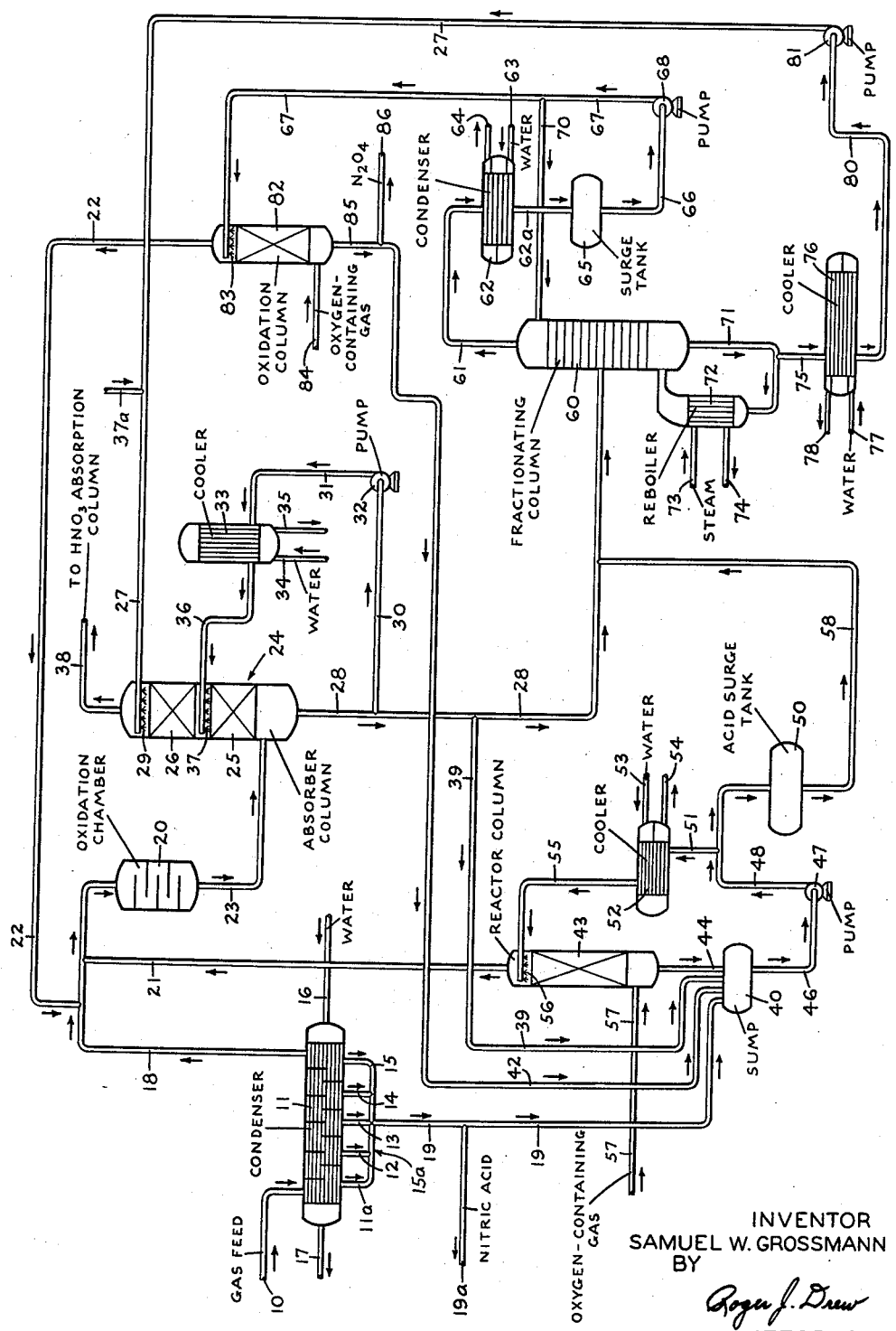
INVENTOR
SAMUEL W. GROSSMANN
BY
Roger J. Drew
ATTORNEY ically higher than the low, typically –10° C. or lower, absorption temperatures of the prior art thereby minimizing the cost of the rectification equipment, completely eliminating the necessity of adding concentrated nitric acid as make-up to the system in normal operation, and enabling use of readily available water as coolant without refrigeration.

United States Patent Office 3,070,425
Patented Dec. 25, 1962

3,070,425
PRODUCTION OF NITROGEN TETROXIDE
Samuel W. Grossmann, Petersburg, Va., assignor to Allied Chemical Corporation, New York, N.Y., a corporation of New York
Filed Oct. 15, 1959, Ser. No. 846,621
4 Claims. (Cl. 23—157)

This invention relates to production of nitrogen tetroxide and more specifically to a process for production of substantially pure nitrogen tetroxide, for instance a nitrogen tetroxide of at least 99.5% concentration.

One object of this invention is to provide a process for production of nitrogen tetroxide which is economical and efficient.

Another object is to provide a process for production of nitrogen tetroxide in good yield and having a minimum purity of 99.5% by weight.

A further object is to provide a process for production of substantially pure nitrogen tetroxide which eliminates the necessity of adding make-up concentrated nitric acid to the system.

A further object is to provide a process for production of substantially pure nitrogen tetroxide wherein the temperature and pressure conditions are selected to minimize the cost of rectification equipment and to enable use of water as coolant without refrigeration.

Additional objects and advantages will be readily apparent as the invention is hereafter described in more detail.

In accordance with the present invention, it has been found that a substantially pure nitrogen tetroxide of at least 99.5% concentration can be obtained by cooling a gas mixture containing primarily nitrogen and lesser amounts of nitric oxide, $NO_2$, oxygen and water vapor to condense a major portion of the water therefrom, separating the gas mixture from the condensate and introducing the gas mixture into an oxidation zone, passing the gas mixture within the oxidation zone to oxidize the nitric oxide by the contained oxygen to increase materially the $NO_2$ content of the mixture, withdrawing the gas mixture of increased $NO_2$ content from the oxidation zone and introducing this gas mixture into a lower portion of an absorption zone, introducing concentrated nitric acid, preferably of about 85–95% concentration into an upper portion of the absorption zone, selectively absorbing the $NO_2$ of the gas mixture by the nitric acid in stages within the absorption zone by passing the gas mixture upwardly within the absorption zone on intimate countercurrent contact in the stages with the concentrated nitric acid passing downwardly therein at a temperature of about 20°–50° C. and under pressure, the nitric acid being of higher concentration in an initial stage than in a subsequent stage of the absorbing, withdrawing a mixture of nitric acid and $NO_2$ from a lower portion of the absorption zone, recirculating a portion of the last-mentioned withdrawn mixture, after cooling by indirect heat exchange into the absorption zone above a subsequent stage therein, passing the remainder of the withdrawn mixture of nitric acid and $NO_2$ into an intermediate section of a fractionating column, fractionating the mixture of nitric acid and $NO_2$ in said column to separate $NO_2$ as overhead fraction from nitric acid as bottoms fraction, condensing the $NO_2$ fraction to obtain liquid $N_2O_4$, refluxing a portion of the liquid $N_2O_4$ into an upper section of the fractionating column, passing the remainder of the $N_2O_4$ fraction into another oxidation zone, introducing an oxygen-containing gas into the last-mentioned oxidation zone, passing the liquid $N_2O_4$ in intimate countercurrent contact with the oxygen-containing gas within the last-mentioned oxidation zone to oxidize any residual nitric oxide present to obtain $N_2O_4$, and removing $N_2O_4$ of at least 99.5% concentration from the last-mentioned oxidation zone. The process is characterized by being efficient and economical, producing in good yield $N_2O_4$ of at least 99.5% concentration, employing temperatures in the absorption zone considerably higher than the low, typically –10° C. or lower, absorption temperatures of the prior art thereby minimizing the cost of the rectification equipment, completely eliminating the necessity of adding concentrated nitric acid as make-up to the system in normal operation, and enabling use of readily available water as coolant without refrigeration.

In a preferred embodiment, the necessity of adding concentrated nitric acid as make-up to the system from an external source for the absorbing step is eliminated by procedure involving dividing the mixture of aqueous nitric acid and $NO_2$ withdrawn from the absorption zone into a minor portion, preferably about 1–3% by weight and a major portion, preferably about 99–97% by weight, combining the minor portion with substantially pure $N_2O_4$ of at least 99.5% concentration and nitric acid of about 30–75% concentration, circulating the combined mixture, after indirect cooling, into an upper portion of another reaction zone, introducing oxygen-containing gas, e.g. commercial oxygen, into a lower portion of the last-mentioned reaction zone, and passing the mixture of $N_2O_4$, water and nitric acid downwardly within the reaction zone in intimate countercurrent contact with the oxygen-containing gas passing upwardly therein to materially increase the concentration of the nitric acid therein to about 87–97% by weight of reaction between the $N_2O_4$, oxygen and water. The nitric acid of about 87–97% concentration is withdrawn from a lower portion of this reaction zone below the point of introduction of the oxygen-containing gas, and passed into admixture with the major portion of the mixture of aqueous nitric acid and $NO_2$ from the absorption zone. This acid concentrating procedure can be operated batchwise or continuous. The resulting admixture is then introduced into an intermediate section of the fractionating column wherein it is fractionated as described to separate $NO_2$ as overhead fraction from concentrated nitric acid as bottoms fraction. The concentrated nitric acid bottoms fraction of about 85–95% concentration is withdrawn from a lower section of the fractionating column and passed, after indirect cooling, to the upper portion of the absorption zone for introduction therein as absorbing liquid.

The accompanying drawing is a diagrammatic flow sheet illustrating the process of the present invention.

Referring to the drawing, a gas mixture comprising typically, in percent by weight, about 71–85% nitrogen, 4–8% nitric oxide, 2–9% $NO_2$, 4–8% oxygen and 0.5–15% water vapor obtained from the high pressure catalytic oxidation of ammonia is introduced at temperature of about 160°–280° C. and pressure of about 90–100 p.s.i.g. through line 10 into condenser 11. The oxidation of ammonia is well known and is usually carried out by oxidizing the ammonia with an oxygen-containing gas, e.g. air or pure oxygen in the presence of a catalyst, e.g. cobalt-nickel or platinum-rhodium at temperature of about 800°–960° C. and at atmospheric or superatmospheric pressure up to 100 p.s.i.g. and even higher. The cobalt-nickel catalyst is used for low pressure oxidation at, for example, 4–22 p.s.ig., and platinum-rhodium catalyst for high pressure oxidation at, for example, 85–100 p.s.i.g. Corresponding temperatures are 800°–830° C. for low pressure operation and 900°–960° C. for high pressure operation. Condenser 11 is constructed of stainless steel and of the shell and tube type. The gas mixture is cooled to a temperature of about 10°–50° C. in condenser 11 by indirect heat exchange with non-refrigerated water to condense a major portion of the water out of the gas. When the gas mixture has been obtained from an atmospheric or slightly higher pressure oxidation of ammonia, the gas mixture can either be cooled by indirect heat exchange with cooling water and then compressed to typically 100 p.s.i.g., or the gas mixture can be cooled by direct contact in a packed column with 35–40% nitric acid at 30°–40° C. to remove the bulk of the water by condensation and then compressed to 100 p.s.i.g. The water has temperature of typically 5–35° C. when introduced into condenser 11 through line 16, and is used in condenser 11 and throughout the process without the requirement of expensive refrigeration. The water is withdrawn through line 17. Some $NO_2$ is lost to $HNO_3$ in condenser 11 by the reaction:

$$3NO_2 + H_2O \rightarrow 2HNO_3 + NO$$

The aqueous nitric acid from cooler-condenser 11 has an overall concentration of about 30–75% by weight and is withdrawn through drain lines 11a, 12, 13, 14 and 15, combined by means of header 15a, and passed into line 19 for transfer to storage through line 19a or, if desired, for further process use through line 19.

The uncondensed gas mixture containing nitrogen, nitric oxide, $NO_2$, oxygen and residual water vapor and nitric acid vapor is withdrawn from condenser 11 through line 18 and passed into the upper portion of oxidation chamber 20. A recycle mixture of $NO_2$ and oxygen from an oxidation column and a reactor column are combined with this mixture through lines 21 and 22 respectively prior to introduction into oxidation chamber 20. Chamber 20 has stainless steel walls and is provided with stainless steel baffle plates. The gas mixture passes downwardly within chamber 20 at temperature of about 20°–50° C. to oxidize the nitric oxide by the contained oxygen to increase materially the $NO_2$ content of the mixture, typically by weight from about 50–90% to about 90–99% (based on total nitric oxide and $NO_2$).

The gas mixture of increased $NO_2$ content is withdrawn from oxidation chamber 20 through line 23 and passed into a lower portion of two stage absorber column 24 constructed of stainless steel. Absorber column 24 is provided with superposed scrubbing stages 25 and 26 respectively, each stage being provided with acid resistant packing, e.g. stoneware. Absorber 24 operates at a temperature of about 20°–50° C. and pressure of about 90–100 p.s.i.g. Nitric acid of about 85–95 weight percent concentration is introduced at temperature of about 20°–50° C. into the upper portion of absorber column 24 through line 27, the acid being sprayed above upper packed absorbing stage 26 by spray heads 29. The nitric acid passes downwardly within absorber 24 in intimate countercurrent contact with the uprising gas mixture first in the region of the packing in upper stage 26 and then in lower stage 25 together wtih recirculated nitric acid containing absorbed $NO_2$ introduced above lower stage 25 by spray heads 37 to selectively absorb the $NO_2$ from the gas mixture. The nitric acid contacting the gas mixture in lower stage 25 is less concentrated than that contacting the gas mixture in stage 26, having concentration of typically about 83–93 weight percent. A mixture of aqueous nitric acid and $NO_2$ is withdrawn from a lower portion of absorber 24 below the point of introduction of the gas mixture therein through line 28, a portion, typically about 30–80% by weight of the withdrawn stream being recirculated via lines 30 and 31 by means of pump 32 to cooler 33 of stainless steel wherein the mixture is cooled to temperature of about 20°–35° C. by indirect heat exchange with water. Cooling water is introduced into cooler 33 at temperature of typically about 5°–35° C. through line 34 and withdrawn therefrom through line 35. The cooled mixture is passed from cooler 33 through line 36 and introduced at temperature of about 20°–35° C. into absorber 24 immediately above lower stage 25 as a plurality of sprays by spray heads 37 for purposes of absorption as described. Concentrated nitric acid is introduced into the system through line 37a only during start-up and the early portion of the process for passage via line 27 into the upper portion of absorber 24 for purposes of absorption. Off gas from the top of absorber column 24 containing primarily nitrogen and minor amounts of nitric oxide, $NO_2$, oxygen, and water and nitric acid vapor including nitric acid generated in the closed system is passed through line 38 to a nitric acid absorption column for recovery of the nitric oxide and $NO_2$ as nitric acid.

In a batchwise operation for a period of one hour each two-hour period, the portion of withdrawn nitric acid absorbing medium not recirculated to the absorber colunm 24, which contains typically, by weight about 6–9% $NO_2$ is divided into a minor portion, preferably about 1–3% by weight of the remainder of the withdrawn stream and a major portion, preferably about 99–97% of such stream. The minor portion is passed via line 39 to sump 40 of stainless steel and the major portion advanced through line 28 for introduction into a fractionating column. The absorbing medium comprising nitric acid, water and $NO_2$ is combined in sump 40 with liquid $N_2O_4$ of minimum $N_2O_4$ concentration of 99.5% introduced through line 42, and nitric acid of overall concentration of about 30–75% from cooler-condenser 11 introduced through line 19. The combined mixture is withdrawn from sump 40 through line 46 and pumped by pump 47 through lines 48 and 51 to cooler 52 wherein it is cooled to remove the heat of reaction by indirect heat exchange with non-refrigerated water to a temperature of about 35°–45° C. Water is introduced at temperature of about 5°–35° C. into cooler 52 through line 53 and withdrawn through line 54.

The cooled mixture is withdrawn from cooler 52 through line 55 and introduced into the upper portion of packed reactor column 43 as liquid sprays by means of spray heads 56. Oxygen-containing gas, e.g. commercial oxygen, is introduced into a lower portion of reactor column 43 through line 57. Pure oxygen instead of commercial oxygen may be introduced into column 43 and also into the oxidation column hereafter described, if desired. Reactor column 43 operates batchwise for the period of one hour each two-hour period at temperature of about 30°–50° C. and pressure of about 90–125 p.s.i.g., is constructed of stainless steel, and is packed with acid-resistant packing, e.g. stoneware packing. The mixture of aqueous nitric acid, $N_2O_4$ and $NO_2$ passes downwardly in reactor column 43 in intimate countercurrent contact in the region of the packing with the oxygen-containing gas passing upwardly therein whereby reaction occurs between the $N_2O_4$, oxygen and water according to the equation: $N_2O_4 + \frac{1}{2}O_2 + H_2O \rightarrow 2HNO_3$ to materially increase the concentration of the nitric acid therein. Continual recirculation of the acid mixture around the system and through reactor 43 over the one-hour period brings the acid concentration up to about 87–97% $HNO_3$. Off gas comprising $NO_2$ and oxygen passes upwardly from the top of reactor column 43 through line 21 for combining with uncondensed gas in line 18 prior to its introduction into oxidation chamber 20. When the desired concentration has been reached (after about one hour), the entire acid stream is passed through line 48 to surge tank 50 of stainless steel wherefrom it is fed continuously through line 58 into admixture with the major portion of the absorbing medium flowing in line 28, and the resulting admixture introduced into an intermediate section of fractionating column 60. While the admixture of absorbing medium and concentrated acid is being advanced to column 60 via line 28, the liquid level in the lower portion of absorber column 24 rises and the liquid level in surge tank 50 drops. When the liquid level in absorber column 24 reaches a predetermined height, the excess liquid is drained to sump 40 through lines 28 and 39 for the batch concentrating operation just described. When the batch operation has been completed, acid surge tank 50 is almost empty so that the completed batch can be dumped into it. Then the entire cycle begins again.

When operating the acid concentrating system continuously, about 1–3% by weight of the absorbing medium is continuously withdrawn from the absorbing medium stream passing through line 28 and passed through line 39 to sump 40. To sump 40 is also continuously added nitric acid (of about 30–75% concentration) from cooler-condenser 11 introduced through line 19 and liquid $N_2O_4$ of minimum $N_2O_4$ concentration of 99.5% passing from column 82 via lines 85 and 42. Also continuously passing into sump 40 is the already concentrated nitric acid stream from reactor column 43. The resultant overall concentration of the mixture in sump 40 is 87–97% acid. This acid is pumped to cooler 52 through lines 46 and 48 and 51 by pump 47 and then passed back into reactor column 43 for repeated concentration. A bleed stream of the acid is continuously drawn off into acid surge tank 50 wherefrom it is continuously passed through line 58 into admixture with the major portion of the absorbing medium flowing in line 28, and the resulting admixture passed into fractionating column 60.

Fractionating column 60 operates with top temperature of about 30° C. and bottom temperature of about 105° C. and pressure of about 8–25 p.s.i.g. Fractionation column 60 is a multi-plate column fabricated of stainless steel, titanium and tantalum and having an inner glass lining. The mixture is fractionally distilled in column 60 and $NO_2$ is separated overhead from nitric acid of typically about 85–95% concentration as bottoms. The $NO_2$ overhead fraction is withdrawn through line 61 and passed to stainless steel condenser 62 wherein it is cooled by indirect heat exchange with non-refrigerated water to condense the $NO_2$ to obtain liquid $N_2O_4$. The cooling water is introduced into condenser 62 at temperature of typically about 5°–35° C. through line 63 and withdrawn through line 64. Liquid $N_2O_4$ is withdrawn from condenser 62 and passed via line 62a to surge tank 65 of stainless steel whence the $N_2O_4$ is passed through lines 66 and 67 by means of pump 68, a portion of the liquid $N_2O_4$ sufficient to provide reflux ratio preferably about 0.25 to 1.0 being withdrawn from line 67 through line 70 and refluxed into the upper portion of fractionating column 60. The acid mixture in the lower portion of column 60 is circulated through integral extension 71 to reboiler 72 of stainless steel, wherein it is heated by indirect heat exchange with steam introduced at pressure of about 65 p.s.i.g. through line 73 and withdrawn through line 74. Nitric acid of concentration about 85–95% is withdrawn through line 75 and passed to cooler 76 of stainless steel wherein it is cooled by indirect heat exchange with water to a temperature of about 20°–35° C. Cooling water is introduced to cooler 76 at temperature typically about 5°–35° C. through line 77 and withdrawn through line 78. The cooled concentrated nitric acid is withdrawn from cooler 76 through line 80 and passed through line 27 by means of pump 81 into the upper portion of absorber column 24 above stage 26 as absorbing liquid as described.

Liquid $N_2O_4$ not returned to fractionating column 60 as reflux and which may contain up to 1% by weight residual nitric oxide is passed through line 67 to the upper portion of packed oxidation column 82 and introduced therein as sprays by means of spray heads 83. Column 82 is constructed of stainless steel and has acid resistant packing, for instance stoneware. Oxygen-containing gas, e.g. commercial oxygen is introduced into the lower portion of column 82 through line 84. The liquid $N_2O_4$ together with any residual nitric oxide passes downwardly in column 82 in intimate countercurrent contact in the region of the packing with the uprising oxygen-containing gas at a temperature of about 20°–40° C. and pressure of about 90–125 p.s.i.g. to oxidize the residual nitric oxide to $NO_2$ which in turn dimerizes to form $N_2O_4$. Substantially pure liquid $N_2O_4$ of 99.5% or higher concentration is withdrawn from column 82 through line 85, about 10–25% by weight of this pure $N_2O_4$ being passed through line 42 to sump 40 and the remaining 90–75% by weight being passed to storage through line 86. Off gas comprising $NO_2$ and oxygen from column 82 passes upwardly via line 22 for combining with the uncondensed gas mixture in line 18 prior to its introduction into oxidation chamber 20. The product $N_2O_4$ from oxidation column 82 is specification product $N_2O_4$ which requires the following purity (percentages by weight):

| | |
|---|---|
| $N_2O_4$ | 99.5% minimum. |
| $H_2O$ equivalent | 0.1% maximum. |
| Cl as NOCl | 0.08% maximum. |
| Non-volatiles (ash) | 0.01% maximum. |

A specific example for practicing the process in accordance with the present invention follows. Percentages and parts are by weight unless otherwise specified.

A gas mixture containing about 72% nitrogen, 4% nitric oxide, 8% $NO_2$, 6% oxygen, and 8% water is continuously introduced at the rate of 1798.7 parts per hour and at temperature and pressure of 240° C. and 110 p.s.i.a., respectively into a cooler-condenser and indirectly cooled to condense water therefrom, nitric acid being formed during the condensing. Aqueous nitric acid of about 41% concentration is withdrawn at the rate of 271.5 parts per hour from the cooler-condenser. The uncondensed gas mixture containing about 84.8% nitrogen, 2.2% nitric oxide, 8.84% $NO_2$, 4.1% oxygen, 0.03% water and 0.03% nitric acid is withdrawn at temperature of 20° C. at the rate of 1527.2 parts per hour from the cooler-condenser and passed into the top of an oxidation chamber. Immediately prior to introduction of the gas mixture into the oxidation chamber, a mixture of about 47% $NO_2$ and 53% oxygen from another reactor is introduced into the uncondensed gas mixture at the rate of 0.34 part per hour, and a mixture of about 44% $NO_2$ and 56% oxygen from another oxidation column is also introduced into the uncondensed gas mixture at the rate of 0.91 part per hour. The combined gas mixture is passed downwardly through the oxidation chamber to oxidize the nitric oxide constituent by the contained oxygen.

A gas mixture containing about 84.7% $N_2$, 0.4% nitric oxide, 11.5% $NO_2$, 3.34% oxygen, 0.03% water and 0.03% nitric acid is withdrawn at temperature of 55° C. from the bottom of the oxidation chamber at the rate of 1528.4 parts per hour and introduced into a lower portion of a two stage packed absorber column immediately below the lower stage. Nitric acid of 90% concentration is introduced at temperature of 20° C. into the absorber column above the upper stage. A mixture of aqueous nitric acid and $NO_2$ is withdrawn from the bottom of the absorber column, and a portion of this withdrawn mixture comprising a mixture of about 83.7% nitric acid, 9.3% water and 7.0% $NO_2$ is withdrawn at the rate of 1330.1 parts per hour from this withdrawn mixture and returned, after indirect cooling to a temperature of about 25° C. into the absorber column immediately above the lower stage and below the upper stage.

The advancing mixture of nitric acid, water and $NO_2$ not recirculated to the absorber column is divided into a minor portion about 1%–3% by weight of the advancing mixture and a major portion about 99%–97% of the advancing mixture, such dividing being carried out batchwise for 1 hour each two-hour period. The minor portion consisted per batch of 45.92 parts nitric acid, 5.1 parts water, and 3.8 parts $NO_2$ and is passed to a sump. 82.3 parts of $N_2O_4$ from another oxidation column is also introduced into the sump during the one-hour period each two hours, and aqueous nitric acid of about 41% concentration from the cooler-condenser is also separately introduced into the sump during this one-hour period each two hours.

The combined mixture is withdrawn from the sump and, after indirect cooling to a temperature of 40° C., introduced at the rate of 83.9 parts per hour as sprays into an upper portion of a packed acid reactor column operating at temperature of 40°–50° C. and pressure of 0–135 p.s.i.g. The acid reactor column is operated batchwise with continual recirculation of the mixture of $N_2O_4$, water and nitric acid for one hour each two-hour period. Commercial oxygen is introduced into the lower portion of the acid reactor column in total amount of 2.6 parts each one-hour operating period. At the end of the reaction period the combined mixture is conducted to the acid reactor product tank maintained at pressure of 100 p.s.i.g., this mixture containing, per batch, 66.6 parts nitric acid, 4.2 parts water and 71.7 parts $NO_2$.

The acid mixture comprising 46.6% nitric acid, 2.9% water and 50.5% $NO_2$ is withdrawn from the acid reactor product tank at the rate of 71.3 parts per hour and combined with the aforementioned major portion of the withdrawn absorbing mixture from the absorber column. The resulting combined mixture comprising 82.7% nitric acid, 9.1% water and 8.2% $NO_2$ is introduced at temperature of 50° C. at the rate of 2704.1 parts per hour into approximately the mid section of a fractionating column. The fractionating column is operated with a top temperature of about 30° C., bottom temperature of about 105° C. and at pressure of about 8–25 p.s.i.g. $NO_2$ is withdrawn at the rate of 271.8 parts per hour from the top of the fractionating column and a portion thereof returned as $N_2O_4$, after indirect cooling to effect liquefaction, into the upper portion of a fractionating column at reflux ratio of 0.33. The concentrated nitric acid bottoms is returned, after indirect cooling to a temperature of 20° C. to an upper portion of the two stage absorber column being introduced therein above the upper stage as a plurality of sprays.

The portion of the $N_2O_4$ not refluxed to the fractionating column is passed at the rate of 204.2 parts per hour together with 0.5% residual nitric oxide into the upper portion of a packed oxidation column as sprays. Commercial oxygen is introduced at the rate of 0.51 part per hour into the lower portion of the bleaching column. The bleacher column is operated at temperature of 31° C. and pressure of 100 p.s.i.g. $N_2O_4$ of minimum concentration of 99.5% by weight is withdrawn at the rate of 203.8 parts per hour from the bottom of the bleacher column. A portion of this withdrawn product $N_2O_4$ is passed at the rate of 162.7 parts per hour to the product storage tank. The remaining portion of this withdrawn product $N_2O_4$ is passed batchwise for 1 hour each two-hour period to the acid reactor sump. Off gas containing 43.9% $NO_2$ and 56.1% oxygen is passed from the top of the bleacher column at the rate of 0.91 part per hour to the uncondensed gas stream from the cooler-condenser and combined therewith prior to its introduction into the oxidation chamber.

The product $N_2O_4$ of the present invention is useful as an oxidizing, nitrating, bleaching and diazotizing agent. It is also in demand for use in liquid-fueled rockets as an oxidizer.

Although certain preferred embodiments of the invention have been disclosed for purpose of illustration, it will be evident that various changes and modifications may be made therein without departing from the scope and spirit of the invention.

What is claimed is:

1. A process for production of nitrogen tetroxide of at least 99.5% nitrogen tetroxide concentration which comprises cooling a gas mixture containing primarily nitrogen and lesser amounts of nitric oxide, $NO_2$, oxygen and water vapor obtained from the catalytic oxidation of ammonia to condense a major portion of the water therefrom, separating the gas mixture from the condensate and introducing the gas mixture as the sole reactants into an oxidation zone, passing the gas mixture containing nitrogen, nitric oxide, $NO_2$, oxygen and residual water vapor through said oxidation zone to oxidize the nitric acid by the contained oxygen to increase materially its $NO_2$ content, withdrawing the gas mixture of increased $NO_2$ content from the oxidation zone and introducing said gas mixture into a lower portion of an absorption zone, introducing concentrated nitric acid of about 85–95% acid concentration into an upper portion of the absorption zone, selectively absorbing the $NO_2$ of the gas mixture by the nitric acid in stages within the absorption zone by passing said gas mixture upwardly within said absorption zone in intimate countercurrent contact in the stages with concentrated nitric acid passing downwardly therein at a temperature of about 20°–50° C. and under pressure, withdrawing a mixture of nitric acid, $NO_2$ and water from a lower portion of the absorption zone, recirculating a portion of the last-mentioned withdrawn mixture, after cooling by indirect heat exchange, into the absorption zone about a subsequent stage therein, passing the remainder of the withdrawn mixture of nitric acid, $NO_2$ and water from the absorption zone and introducing the same into an intermediate section of a fractionating column, fractionating the mixture of aqueous nitric acid and $NO_2$ in said column to separate $NO_2$ as overhead fraction from aqueous nitric acid as bottoms fraction, condensing the $NO_2$ fraction to obtain liquid $N_2O_4$, refluxing a portion of the liquid $N_2O_4$ into an upper section of the fractionating column, passing the remaining $N_2O_4$ fraction into another oxidation zone, introducing an oxygen-containing gas into the last-mentioned oxidation zone, passing the liquid $N_2O_4$ in intimate countercurrent contact with the oxygen-containing gas within the last-mentioned oxidation zone to oxidize any residual nitric oxide present, and removing $N_2O_4$ of at least 99.5% $N_2O_4$ concentration from the last-mentioned oxidation zone.

2. A process for production of nitrogen tetroxide of at least 99.5% nitrogen tetroxide concentration, which comprises cooling by indirect heat exchange a gas mixture containing primarily nitrogen and lesser amounts of nitric oxide, $NO_2$, oxygen and water vapor obtained from the catalytic oxidation of ammonia to condense a major portion of the water therefrom, separating the gas mixture from the condensate and introducing the gas mixture as the sole reactants into an oxidation zone, passing the gas mixture containing nitrogen, nitric oxide, $NO_2$, oxygen and residual water vapor through the oxidation zone to oxidize the nitric oxide by the contained oxygen to increase materially its $NO_2$ content, withdrawing the gas mixture of increased $NO_2$ content from the oxidation zone and introducing said gas mixture into a lower portion of an absorber column, introducing nitric acid to about 85%–95% acid concentration into an upper portion of the absorber column, selectively absorbing the $NO_2$ of the gas mixture in two superposed stages within said absorber column by passing said gas mixture upwardly within said absorber column in intimate countercurrent contact in the stages with the nitric acid of about 85%–95% acid concentration passing downwardly therein at a temperature of about 20°–50° C. and pressure of about 90–100 p.s.i.g., withdrawing a mixture of nitric acid, $NO_2$ and water from a lower portion of the absorber column below the point of introduction of the gas mixture therein, recirculating a portion of the last-mentioned withdrawn mixture, after cooling by indirect heat exchange, into the absorber column in a region thereof above the lower stage and below the upper stage, dividing the remainder of the withdrawn mixture of nitric acid, $NO_2$ and water into a minor portion and a major portion, combining said minor portion with $N_2O_4$ of at least 99.5% $N_2O_4$ concentration and nitric acid of about 30–75% acid concentration, passing the combined mixture, after cooling by indirect heat exchange, into an upper portion of another reaction zone, introducing an oxygen-containing gas into a lower portion of the last-mentioned reaction zone, passing the mixture of $N_2O_4$, water and nitric acid downwardly within said reaction zone in intimate countercurrent contact with oxygen-containing gas passing upwardly therein to materially increase the concentration of the nitric acid therein by reaction between the $N_2O_4$, oxygen and water, withdrawing the nitric acid of increased concentration from the last-mentioned reaction zone below the point of introduction of the oxygen-containing gas and passing the same into admixture with the major portion of the mixture of aqueous nitric acid and $NO_2$ from the absorber column, introducing the admixture into an intermediate section of a fractionating column, fractionating the mixture of nitric acid and $NO_2$ in said column to separate $NO_2$ as overhead fraction from aqueous nitric acid of about 85%–95% acid concentration as bottoms fraction, condensing the $NO_2$ fraction to obtain liquid $N_2O_4$, refluxing a portion of the liquid $N_2O_4$ into an upper section of the fractionating column, withdrawing the nitric acid bottoms fraction of about 85%–95% acid concentration from a lower section of the fractionating column and passing the same, after cooling by indirect heat exchange, to the upper portion of the absorber column for introduction therein as absorbing liquid, passing the remaining $N_2O_4$ fraction into an upper portion of another oxidation zone, introducing an oxygen-containing gas into a lower portion of the last-mentioned oxidation zone, passing the liquid $N_2O_4$ downwardly within said oxidation zone in intimate countercurrent contact with oxygen-containing gas passing upwardly therein to oxidize any nitric oxide present, and removing $N_2O_4$ of at least 99.5% $N_2O_4$ concentration from a lower portion of the last-mentioned oxidation zone below the point of introduction of the oxygen-containing gas therein.

3. A process for production of nitrogen tetroxide of at least 99.5% nitrogen tetroxide concentration which comprises cooling by indirect heat exchange a gas mixture containing, by volume, about 71–85% nitrogen, 4–8% nitric oxide, 2–9% $NO_2$, 4–8% oxygen and 0.5–15% water obtained from the catalytic oxidation of ammonia to condense a major portion of the water therefrom, separating the gas mixture from the condensate and introducing the gas mixture as the sole reactants into an upper portion of an oxidation chamber, passing the gas mixture containing nitrogen, nitric oxide, $NO_2$, oxygen and residual water vapor downwardly through the oxidation chamber to oxidize the nitric oxide by the contained oxygen, withdrawing the gas mixture of increased $NO_2$ content from a lower portion of the oxidation chamber and introducing said gas mixture into a lower portion of an absorber column, introducing nitric acid of about 85%–95% acid concentration into an upper portion of the absorber column, selectively absorbing the $NO_2$ of the gas mixture in two superposed stages within said absorber column by passing said gas mixture upwardly within said absorber column in intimate countercurrent contact in the stages with the nitric acid of about 85%–95% acid concentration passing downwardly therein at a temperature of about 20°–50° C. and pressure of about 90–100 p.s.i.g., withdrawing a mixture of nitric acid, $NO_2$ and water from a lower portion of the absorber column below the point of introduction of the gas mixture therein, recirculating a portion of the last-mentioned withdrawn mixture, after cooling by indirect heat exchange, into the absorber column in a region thereof above the lower stage and below the upper stage, dividing the remainder of the withdrawn mixture of nitric acid and $NO_2$ into, by weight, a minor portion of about 1%–3% and a major portion of about 99%–97%, combining said minor portion with $N_2O_4$ of at least 99.5% $N_2O_4$ concentration and nitric acid of about 30%–75% acid concentration, passing the combined mixture, after cooling by indirect heat exchange, into an upper portion of a reactor column, introducing oxygen-containing gas into a lower portion of said reactor column, passing the mixture of $N_2O_4$, water and nitric acid downwardly within said reactor column in intimate countercurrent contact with the oxygen-containing gas passing upwardly therein at temperature of about 20°–50° C. and pressure of about 90–125 p.s.i.g. to materially increase the concentration of the nitric acid therein by reaction between the $N_2O_4$, oxygen and water, continually recirculating and passing the mixture of $N_2O_4$, water and nitric acid within said reactor column in countercurrent contact with the oxygen-containing gas as aforesaid until the nitric acid concentration thereof is increased to about 87%–97%, then withdrawing the nitric acid having concentration of about 87%–97% from said reactor column below the point of introduction of oxygen-containing gas therein and passing the same into admixture with the major portion of the mixture of aqueous nitric acid and $NO_2$ from the absorber column, introducing the admixture into an intermediate section of a fractionating column, fractionating the mixture of nitric acid and $NO_2$ in said fractionating column to separate $NO_2$ as overhead fraction from aqueous nitric acid of about 85%–95% acid concentration as bottoms fraction, condensing the $NO_2$ fraction to obtain liquid $N_2O_4$, refluxing a portion of the liquid $N_2O_4$ into an upper section of the fractionating column, withdrawing the nitric acid bottoms fraction of about 85%–95% acid concentration from the fractionating column and passing the same, after cooling by indirect heat exchange, to the upper portion of the absorber column for introduction therein as absorbing liquid, passing the remaining $N_2O_4$ fraction into an upper portion of another reactor column, introducing oxygen-containing gas into a lower portion of the last-mentioned column, passing the liquid $N_2O_4$ downwardly within the column in intimate countercurrent contact with the oxygen-containing gas passing upwardly therein at temperature of about 20°–40° C. and pressure of about 90–125 p.s.i.g. to oxidize any residual nitric oxide, and removing $N_2O_4$ of at least 99.5% $N_2O_4$ concentration from the last-mentioned column below the point of introduction of the oxygen-containing gas therein.

4. A process for production of substantially pure nitrogen tetroxide which comprises cooling a gas mixture containing primarily nitrogen and lesser amounts of nitric oxide, $NO_2$, oxygen and water vapor to condense a major portion of the water therefrom, separating the gas mixture from the condensate and introducing the gas mixture as the sole reactants, into an oxidation zone, passing the gas mixture containing nitrogen, nitric oxide, $NO_2$, oxygen and residual water vapor within said oxidation zone to oxidize the nitric oxide by the contained oxygen to increase materially its $NO_2$ content, withdrawing the gas mixture of increased $NO_2$ content from the oxidation zone, absorbing the $NO_2$ of the gas mixture in nitric acid of about 85–95% acid concentration at a temperature of about 20°–50° C. and under pressure, fractionating the mixture of nitric acid and $NO_2$ to separate $NO_2$ as overhead fraction from nitric acid as bottoms fraction, condensing the $NO_2$ fraction to obtain liquid $N_2O_4$, passing the liquid $N_2O_4$ in intimate countercurrent contact with an oxygen-containing gas within another oxidation zone to oxidize any residual nitric oxide present, and removing a substantially pure $N_2O_4$ from the last-mentioned oxidation zone.

References Cited in the file of this patent

UNITED STATES PATENTS

| | | |
|---|---|---|
| 1,901,816 | Luscher | Mar. 14, 1933 |
| 2,128,527 | Fisher | Aug. 30, 1938 |
| 2,138,165 | Hechenbleikner | Nov. 29, 1938 |
| 2,185,580 | Beekhuis | Jan. 2, 1940 |
| 2,725,280 | Yodis | Nov. 29, 1955 |
| 2,761,761 | Congdon | Sept. 4, 1956 |
| 2,935,480 | Levering | May 3, 1960 |